US009921954B1

(12) United States Patent
Sabbag et al.

(10) Patent No.: US 9,921,954 B1
(45) Date of Patent: Mar. 20, 2018

(54) METHOD AND SYSTEM FOR SPLIT FLASH MEMORY MANAGEMENT BETWEEN HOST AND STORAGE CONTROLLER

(75) Inventors: Erez Sabbag, Kiryat Tivon (IL); Hanan Weingarten, Hertzelia (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 122 days.

(21) Appl. No.: 13/595,848

(22) Filed: Aug. 27, 2012

(51) Int. Cl.
*G06F 12/02* (2006.01)

(52) U.S. Cl.
CPC .................. *G06F 12/0246* (2013.01)

(58) Field of Classification Search
CPC ......... G06F 2212/7205; G06F 12/0253; G06F 11/1068; G06F 12/0866; G06F 2212/7203; G06F 2212/7207; G06F 3/0679
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,586,291 A * | 12/1996 | Lasker et al. ................. 711/113 |
| 5,592,641 A | 1/1997 | Doyle et al. |
| 5,623,620 A | 4/1997 | Alexis et al. |
| 5,640,529 A | 6/1997 | Hasbun |
| 5,657,332 A | 8/1997 | Auclair et al. |
| 5,663,901 A | 9/1997 | Harari et al. |
| 5,724,538 A | 3/1998 | Bryg |
| 5,729,490 A | 3/1998 | Calligaro et al. |
| 5,740,395 A | 4/1998 | Wells |
| 5,745,418 A | 4/1998 | Ting-Chung Hu et al. |
| 5,778,430 A | 7/1998 | Giovannetti |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Ting-Chung Hu et al. |

(Continued)

OTHER PUBLICATIONS

IEEE The Authoritative Dictionary of IEEE Standards Terms Seventh Edition, Published 2000 pp. 793 1017, 1184.*

(Continued)

*Primary Examiner* — Reginald G Bragdon
*Assistant Examiner* — Paul M Knight
(74) *Attorney, Agent, or Firm* — Sheridan Ross P.C.

(57) ABSTRACT

A computer readable medium, a system and a method for flash memory device that my store instructions for receiving from a host computer a first command that is a write command of a first data unit to a flash memory device, receiving, from the host computer, a second command that is indicative of a manner in which at least one entity out of (a) memory management metadata, (b) the first data unit and (c) at least one other data unit, should be stored in the flash memory device, and programming the at least one entity in the flash memory device in response to the second command.

20 Claims, 13 Drawing Sheets

(56) References Cited

U.S. PATENT DOCUMENTS

| | | |
|---|---|---|
| 5,956,268 A | 9/1999 | Lee |
| 5,956,473 A | 9/1999 | Ting-Chung Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,064,670 A * | 5/2000 | Athenes et al. ............... 370/375 |
| 6,081,878 A | 6/2000 | Estakhri |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett |
| 7,388,781 B2 | 6/2008 | Litsyn |
| 7,395,404 B2 | 7/2008 | Gorobets |
| 7,441,067 B2 | 10/2008 | Gorobets et al. |
| 7,443,729 B2 | 10/2008 | Li |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell |
| 7,619,922 B2 | 11/2009 | Li |
| 7,697,326 B2 | 4/2010 | Sommer et al. |
| 7,706,182 B2 | 4/2010 | Shalvi et al. |
| 7,716,538 B2 | 5/2010 | Gonzalez |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun |
| 7,961,797 B1 | 6/2011 | Yang et al. |
| 7,975,192 B2 | 7/2011 | Sommer |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang |
| 8,250,324 B2 | 8/2012 | Haas |
| 8,300,823 B2 | 10/2012 | Bojinov |
| 8,305,812 B2 | 11/2012 | Levy |
| 8,327,246 B2 | 12/2012 | Weingarten |
| 8,407,560 B2 | 3/2013 | Ordentlich |
| 8,417,893 B2 | 4/2013 | Khmelnitsky |
| 8,799,740 B2 * | 8/2014 | Seo et al. ............... 714/758 |
| 2001/0034815 A1 | 10/2001 | Dugan et al. |
| 2002/0063774 A1 | 5/2002 | Hillis et al. |
| 2002/0085419 A1 | 7/2002 | Choi |
| 2002/0154769 A1 | 10/2002 | Petersen et al. |
| 2002/0156988 A1 | 10/2002 | Sekibe |
| 2002/0174156 A1 | 11/2002 | Birru |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee |
| 2003/0192007 A1 | 10/2003 | Miller et al. |
| 2004/0015771 A1 | 1/2004 | Lasser et al. |
| 2004/0030971 A1 | 2/2004 | Shibata |
| 2004/0049632 A1 * | 3/2004 | Chang et al. ............... 711/114 |
| 2004/0059768 A1 | 3/2004 | Denk |
| 2004/0080608 A1 * | 4/2004 | Monroe ............... 348/14.08 |
| 2004/0080985 A1 | 4/2004 | Chang et al. |
| 2004/0111427 A1 * | 6/2004 | Gu ............... 707/101 |
| 2004/0153722 A1 | 8/2004 | Lee |
| 2004/0153817 A1 | 8/2004 | Chevallier |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0063242 A1 * | 3/2005 | Ren ............... G06F 8/665 365/222 |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 * | 6/2005 | Chung et al. ............... 711/103 |
| 2005/0169057 A1 | 8/2005 | Shibata |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0076484 A1 * | 4/2007 | Cho et al. ............... 365/185.21 |
| 2007/0076680 A1 * | 4/2007 | Amram ............... H04L 1/0083 370/349 |

(56) References Cited

U.S. PATENT DOCUMENTS

| | | |
|---|---|---|
| 2007/0081388 A1 | 4/2007 | Joo |
| 2007/0083491 A1* | 4/2007 | Walmsley et al. ............... 707/3 |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0186032 A1* | 8/2007 | Sinclair et al. ............... 711/103 |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata |
| 2007/0263439 A1 | 11/2007 | Cornwell et al. |
| 2007/0266291 A1 | 11/2007 | Toda et al. |
| 2007/0271426 A1* | 11/2007 | Watanabe et al. ............ 711/159 |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee |
| 2008/0065819 A1* | 3/2008 | Guo et al. ..................... 711/105 |
| 2008/0082897 A1 | 4/2008 | Brandman et al. |
| 2008/0091901 A1* | 4/2008 | Bennett et al. ............... 711/165 |
| 2008/0092026 A1 | 4/2008 | Brandman et al. |
| 2008/0104309 A1 | 5/2008 | Cheon et al. |
| 2008/0112238 A1 | 5/2008 | Kim |
| 2008/0116509 A1 | 5/2008 | Harari et al. |
| 2008/0126686 A1 | 5/2008 | Sokolov et al. |
| 2008/0127104 A1 | 5/2008 | Li |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0077446 A1* | 3/2009 | Seo et al. ..................... 714/755 |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0027961 A1 | 6/2009 | Park |
| 2009/0144598 A1 | 6/2009 | Yoon |
| 2009/0144600 A1 | 6/2009 | Perlmutter et al. |
| 2009/0144781 A1* | 6/2009 | Glaser et al. ................... 725/89 |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi |
| 2009/0287930 A1 | 11/2009 | Nagaraja |
| 2009/0288125 A1* | 11/2009 | Morioka ....................... 725/110 |
| 2009/0300269 A1 | 12/2009 | Radke et al. |
| 2009/0323942 A1 | 12/2009 | Sharon |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0174853 A1 | 7/2010 | Lee |
| 2010/0180073 A1 | 7/2010 | Weingarten et al. |
| 2010/0172179 A1 | 8/2010 | Gorobets et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0231735 A1* | 9/2010 | Burian et al. ............... 348/220.1 |
| 2010/0241793 A1 | 9/2010 | Sugimoto |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette |
| 2010/0149881 A1 | 11/2010 | Lee et al. |
| 2010/0293321 A1 | 11/2010 | Weingarten |
| 2010/0312960 A1* | 12/2010 | Bert ....................... G06F 12/0866 711/113 |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0061113 A1* | 3/2011 | Rubinstein et al. ............. 726/34 |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0125955 A1* | 5/2011 | Chen ............................ 711/103 |
| 2011/0153919 A1 | 6/2011 | Sabbag |
| 2011/0161775 A1 | 6/2011 | Weingarten |
| 2011/0185105 A1* | 7/2011 | Yano et al. ................... 711/103 |
| 2011/0194353 A1 | 8/2011 | Hwang |
| 2011/0209028 A1 | 8/2011 | Post |
| 2011/0214029 A1 | 9/2011 | Steiner et al. |
| 2011/0214039 A1 | 9/2011 | Steiner et al. |
| 2011/0231598 A1* | 9/2011 | Hatsuda ........................ 711/103 |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |

(56) References Cited

U.S. PATENT DOCUMENTS

| | | |
|---|---|---|
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0036312 A1* | 2/2012 | Feldman et al. ............. 711/103 |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1 | 5/2012 | Goss et al. |
| 2012/0246391 A1 | 9/2012 | Meir |
| 2013/0019051 A1* | 1/2013 | Somanache ......... G06F 12/0246 711/103 |

OTHER PUBLICATIONS

FIFO Architecture, Functions, and Applications, Texas Instruments, Author not Shown, 1999.*

DFTL: A Flash Translation Layer Employing Demand-based Selective Caching of Page-level Address Mappings by Bupta, Kim, and Urgaonkar Pennsylvania State University; Aug. 2008; p. 7.*

ONFI Open NAND Flash Interface Specification Mar. 2011.*

HP Understanding the HP Data Deduplication Strategy; HP 2008.*

A Page Padding Method for Fragmented Flash Storage; Kim; Springer 2007.*

The Authoritative Dictionary of IEEE Standards Terms IEEE 2000.*

Embedded Linux: Using Compressed File Systems by Michael Hammel Jan. 2007; Published on the internet: https://lwn.net/Articles/219827/.*

NAND Flash memory in embedded systems by Michael Jedrak; As published on the internet Oct. 2010.*

Search Report of PCT Patent Application WO 2009/118720 A3, dated Mar. 4, 2010.

Search Report of PCT Patent Application WO 2009/095902 A3, dated Mar. 4, 2010.

Search Report of PCT Patent Application WO 2009/078006 A3, dated Mar. 4, 2010.

Search Report of PCT Patent Application WO 2009/074979 A3, dated Mar. 4, 2010.

Search Report of PCT Patent Application WO 2009/074978 A3, dated Mar. 4, 2010.

Search Report of PCT Patent Application WO 2009/072105 A3, dated Mar. 4, 2010.

Search Report of PCT Patent Application WO 2009/072104 A3, dated Mar. 4, 2010.

Search Report of PCT Patent Application WO 2009/072103 A3, dated Mar. 4, 2010.

Search Report of PCT Patent Application WO 2009/072102 A3, dated Mar. 4, 2010.

Search Report of PCT Patent Application WO 2009/072101 A3, dated Mar. 4, 2010.

Search Report of PCT Patent Application WO 2009/072100 A3, dated Mar. 4, 2010.

Search Report of PCT Patent Application WO 2009/053963 A3, dated Mar. 4, 2010.

Search Report of PCT Patent Application WO 2009/053962 A3, dated Mar. 4, 2010.

Search Report of PCT Patent Application WO 2009/053961 A3, dated Mar. 4, 2010.

Search Report of PCT Patent Application WO 2009/037697 A3, dated Mar. 4, 2010.

Yani Chen, Kcshab K. Parhi, "Small Area Parallel Chien Search Architectures for Long BCH Codes", Ieee Transactions on Very Large Scale Integration(VLSI) Systems, vol. 12, No. 5, May 2004.

Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.

Michael Purser, "Introduction to Error Correcting Codes", Artech House Inc., 1995.

Ron M. Roth, "Introduction to Coding Theory", Cambridge University Press, 2006.

Akash Kumar, Sergei Sawitzki, "High-Throughput and Low Power Architectures for Reed Solomon Decoder", (a.kumar at tue.nl, Eindhoven University of Technology and sergei.sawitzki at philips.com), Oct. 2005.

Todd K.Moon, "Error Correction Coding Mathematical Methods and Algorithms", A John Wiley & Sons, Inc., 2005.

Richard E. Blahut, "Algebraic Codes for Data Transmission", Cambridge University Press, 2003.

David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.

Giovanni Campardo, Rino Micheloni, David Novosel, "VLSI-Design of Non-Volatile Memories", Springer Berlin Heidelberg New York, 2005.

John G. Proakis, "Digital Communications", 3rd ed., New York: McGraw-Hill, 1995.

J.M. Portal, H. Aziza, D. Nee, "EEPROM Memory: Threshold Voltage Built in Self Diagnosis", ITC International Test Conference, Paper 2.1, Feb. 2005.

J.M. Portal, H. Aziza, D. Nee, "EEPROM Diagnosis Based on Threshold Voltage Embedded Measurement", Journal of Electronic Testing: Theory and Applications 21, 33-42, 2005.

G. Tao, A. Scarpa, J. Dijkstra, W. Stidl, F. Kuper, "Data retention prediction for modern floating gate non-volatile memories", Microelectronics Reliability 40 (2000), 1561-1566.

T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.

Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com , 2005.

Paulo Cappelletti, Clara Golla, Piero Olivo, Enrico Zanoni, "Flash Memories", Kluwer Academic Publishers, 1999.

Jedec Standard, "Stress-Test-Driven Qualification of Integrated Circuits", JEDEC Solid State Technology Association. JEDEC Standard No. 47F pp. 1-26, Dec. 2007.

Dempster, et al., "Maximum Likelihood from Incomplete Data via the EM Algorithm", Journal of the Royal Statistical Society. Series B (Methodological), vol. 39, No. 1 (1997), pp. 1-38.

Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.

Daneshbeh, "Bit Serial Systolic Architectures for Multiplicative Inversion and Division over GF (2)", A thesis presented to the University of Waterloo, Ontario, Canada, 2005, pp. 1-118.

Chen, Formulas for the solutions of Quadratic Equations over GF (2), IEEE Trans. Inform. Theory, vol. IT-28, No. 5, Sep. 1982, pp. 792-794.

Berlekamp et al., "On the Solution of Algebraic Equations over Finite Fields", Inform. Cont. 10, Oct. 1967, pp. 553-564.

* cited by examiner

| Header 12 | Data 14 |

10

Prior art

FIG. 1

| First physical address 311 | Data0 312 | Data1 314 | Data2 316 |

310

| Second physical address 321 | MetaData0, MetaData1, MetaData2 322 |

| First address 610 | Physical Block Address to Open 620 | MSB bits identifiers 630 |

| Header Address = "read to buffers" 710 | # of segments to be read 720 | Segment Physical addresses 730 | Segment locations on buffer 740 | # of segments from host to be stitched buffer 750 | Segment locations on buffer 760 | Open buffer destination 770 |

Receiving, by a flash storage device and from a host computer, a metadata recovery command. The metadata recovery command may include a first address that belongs to a memory space that is not mapped to user data. The value of the first address can identify this command as a metadata recovery command. 1010

Sending, from the flash storage device, metadata that is retreived from perdetermined locations in the flash storage device. 1020

METHOD AND SYSTEM FOR SPLIT FLASH MEMORY MANAGEMENT BETWEEN HOST AND STORAGE CONTROLLER

BACKGROUND OF THE INVENTION

Flash memory devices store information with high density on flash memory cells with ever smaller dimensions. In addition, Multi-Level Cells (MLC) may store several bits per cell (bpc).

Flash memory devices are organized into physical pages. Each physical page includes a section allocated for data (e.g., 512 bytes-16 KB and more) and a small amount of spare bytes (e.g., 64-1024 bytes or more bytes for every page) for storing redundancy and metadata.

The redundancy bytes are used to store error correcting information, for correcting errors which may have occurred during flash memory device lifetime and the page read process. Each programming (write) operation is performed on an entire page. A number of pages are grouped together to form an erase block (also referred to as block). A page cannot be erased unless the entire block (which includes that page) is erased.

Non-limiting examples of flash storage devices may include Secure Digital cards (SD), embedded Multi-Media cards (eMMC). USB drives, and Solid State Disks (SSDs). The flash storage device (such as an SSD, a SD card, a USB drive or an eMMC card) may typically include a flash memory device and a flash memory controller.

The flash storage device may be connected to another computer (referred to as a host computer or simply host) via an interface.

The interface supports a protocol that defines fixed size transfers (for example—512 bytes or an integer multiplication of 512 bytes) of data with a predetermined header indicative of whether the command is a read command or a write command. The protocol does not allow sending memory management metadata attached to the data itself.

Figure 1:
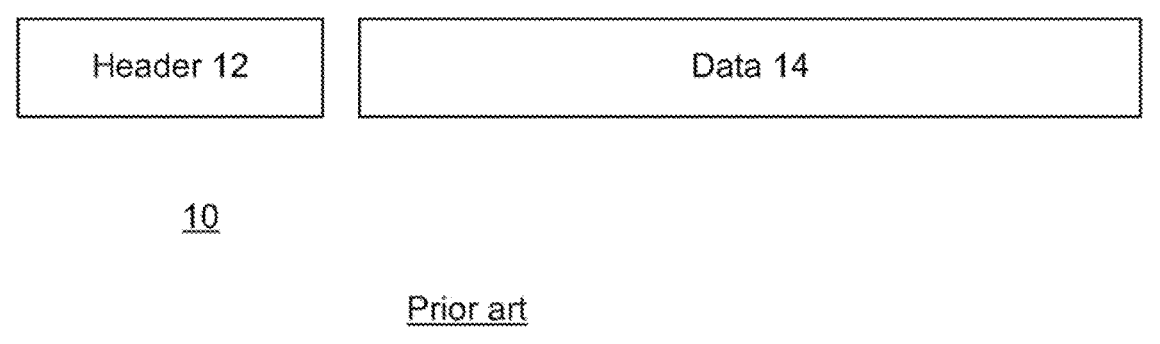

FIG. 1 illustrates a prior art read or write command 10. The read or write command 10 includes a 32-bit header 12 and if it is a write command—also includes one or more data chunks 14 of 512 bytes each. In a read command data is sent from the flash memory device to the host computer. The header 12 indicates whether the command is a read command or a write command.

The flash memory controller translates commands received from the interface into actions (Read/Write/Erase) on the flash memory device. The most common commands may be read commands and write commands of one or more sectors, where a sector may be, but is not limited to, a sequence of 512 bytes.

The read commands or write commands may be of a single sector or multiple sectors. These commands may refer to logical addresses. These addresses may then be redirected to new addresses on the flash memory device which need not directly correspond to the logical addresses that might be referenced by the read or write commands.

This is due to memory management that may be carried out by the flash memory controller in order to support several features such as wear-leveling, bad block management, error-correction, and others.

Because of this functionality, before the data of a selected block may be replaced, such as during a write function, the new data must be written in an alternative location before an erase can occur, to preserve the integrity of the stored data.

Such memory management may require resources such as memory. In many flash storage devices, the flash memory controller may typically have only a small random access memory (RAM) available for storage. The small size of the RAM limits the type of memory management which may be carried out by the flash memory controller with regard to the data stored in the flash memory device and data received via the interface.

Performance-oriented flash storage devices may typically manage the flash memory device at the page level. In this approach, each logical page address is associated with an arbitrary physical page address, and the flash memory controller maintains this association (mapping). In this method, part of the physical space is mapped to logical data (user data), and the rest of the physical space is set aside for memory management purposes and is typically named over provisioning.

At each time, one or more blocks may be open for writing. When a logical page is to be written, the flash memory controller writes its content into the next available physical page in an open block and updates the physical association of this logical page to the new location. The previous physical location which held the data of this logical address prior to the write is typically designated as obsolete or superseded. The remaining physical pages in a block which are not superseded are called valid physical pages. Once all of the physical pages of an open block are written, a fresh block from the over provisioning is taken, and future writes resume to this block.

Once no more free blocks from the over provisioning are available to host new pages, or the number of free blocks is reduced below some threshold, the flash memory controller begins a process in which valid physical pages from a first block with superseded physical pages are copied into a second empty block, and once no more valid physical pages are left in the first block, the first block is added to the list of free blocks. This process is typically called cleaning.

A logical page designated by a logical page address is read by first looking up its physical address and then reading the data from the physical address which is associated to this logical page.

The flash memory controller may implement a logical to physical (L2P) mapping between a logical page address and a physical page address by means of a L2P table. The L2P table may be a list of entries that hold, for each logical page which is mapped in the user space, a corresponding physical address.

However, such management may require L2P tables which are much larger than the available resources in a flash storage device such as an SD card or an eMMC card.

Therefore, SD cards, will typically manage the flash memory devices at the block level. Modification to some data in the blocks will require copying an entire block with the relevant data modified. Alternatively, SD card and eMMC cards may implement a hybrid management approach, where some of the memory area is used as a buffer and is managed at a smaller granularity (e.g. page) and the rest of the memory is managed at the block level.

In addition, a flash storage device such as an SD or eMMC card, the flash storage device may store some of the databases used in management (e.g. L2P) on the flash memory devices, to overcome the limited size of RAM. However, this is not very efficient, as every read operation or write operation may first require reading an L2P portion from the flash memory device and updating it in the flash memory device, before accessing the data stored in the flash memory device and prior to completing a write task.

There is a growing need to provide efficient memory management schemes.

SUMMARY

Embodiments of the invention include a computer readable medium that is non-transitory and may store instructions for receiving from a host computer a first command that is a write command of a first data unit to a flash memory device; receiving, from the host computer, a second command that is indicative of a manner in which at least one entity out of (a) memory management metadata, (b) the first data unit and (c) at least one other data unit, should be stored in the flash memory device; and programming the at least one entity in the flash memory device in response to the second command.

The first command may include a physical address within a first block of a flash memory device; wherein the second command may include a physical address within a second block of the flash memo device; wherein the second block differs from the first block; and wherein the non-transitory computer readable medium stores instructions for storing the first data unit in a first flash memory buffer and storing the memory management metadata in a second flash memory buffer.

The first command may include a physical address within a block of the flash memory device: wherein the second command may include a physical address within a second block of the flash memory device: wherein the second block differs from the first block; and wherein the non-transitory computer readable medium stores instructions for storing the first data unit and the memory management metadata at blocks of the flash memory device that differ from each other.

The at least one entity is the memory management metadata.

The second command may include a second address that identifies the second command as a linked storage command that links a storage of the memory management metadata and the first data unit.

The second command is indicative of a programming the first data unit and the memory management metadata to proximate locations of a flash memory device.

The second command is indicative of a concatenation of the first data unit and the memory management metadata.

The second address belongs to a memory space that is not mapped to physical addresses of the flash memory device.

The non-transitory computer readable medium may store instructions for ignoring the second command if a timing difference between the receiving of the second command and the receiving of the first command exceeds a timing threshold.

The non-transitory computer readable medium may store instructions for programming the first data unit to a flash memory buffer that is managed at a different granularity than at least one other region of the flash memory device.

Further embodiments of the invention include a computer readable medium that is non-transitor and may store instructions for receiving, by a flash storage device and from a host computer, a first command that indicates that data associated with a second command should be programmed to a flash memory buffer of the flash storage device; wherein the first command may include a first address that belongs to a memory space that is not mapped to user data; and receiving the second command; wherein the second command may include a second address and a data unit; ignoring, by the flash storage device, the second address and programming the data unit to the flash memory buffer.

The non-transitory computer readable medium, may store instructions for selecting the flash memory buffer out of multiple flash memory buffers based upon a value of the first address.

The non-transitory computer readable medium, may store instructions for appending the second address to the data unit.

The memory management command may indicate that multiple additional write command that follow the first command are aimed to the flash memory buffer, wherein the non-transitory computer readable medium stores instructions for receiving the additional write commands; wherein each of the multiple additional commands may include an address and data; and ignoring the address included in each of the multiple additional commands and writing the data of each additional command to the flash memory buffer.

Some embodiments of the invention include a computer readable medium that is non-transitory and may store instructions for receiving, by a flash storage device, a copy-back and stitch command from a host computer: copying, in response to the copy-back and stitch command, first data from a first location of a flash memory device of the flash storage device to a random access memory (RAM) device of the flash storage device: wherein the copying is executed without sending the first data to host computer: receiving second data from the host computer; and storing the first data and the second data at a second location of the flash memory device.

The copy-back and stitch command may include a first address that belongs to a memory space that is not mapped to user data.

The non-transitory computer readable medium may store instructions for determining the first location in response to a second address field included in the copy-back and stitch command; determining a location in the random access module to store the first data in response to a third address field of the copy-back and stitch command: determining an amount of second data to receive from the host based upon a second data size field of the copy-back and stitch command; and determining the second location in response to a fourth address field of the copy-back and stitch command.

Some embodiments of the invention include a computer readable medium that is non-transitory and may store instructions for receiving, by a flash storage device and from a host computer, first data: receiving, by the flash storage device, a data segmentation and signature calculation command; segmenting the first data to data segments and calculating a size of each data segment; calculating, by the flash storage device, a signature for each data segment of the data segments; receiving, from the host computer, a segment size and signature retrieval command; and sending to the host device information indicative of a signature and a size of each data segment.

The data segmentation and signature calculation command may include a first address; wherein the segment size and signature retrieval command may include a second address; wherein the first address and the second address belong to a memory space that is not mapped to user data.

The segmenting and calculating are responsive to segmenting parameters and signature calculation parameters included in the data segmentation and signature calculation command.

Some embodiments of the invention include a computer readable medium that is non-transitory and may store instructions for receiving, by a flash storage device and from a host computer, a metadata recovery command; and sending, from the flash storage device, metadata that is retrieved from predetermined locations in the flash storage device.

The metadata recovery command may include a first address that belongs to a memory space that is not mapped to user data.

According to an embodiment of the invention a method may be provided and may include performing any of the instruction indicated above.

A method may be provided and may include receiving from a host computer a first command that is a write command of a first data unit to a flash memory device; receiving, from the host computer, a second command that is indicative of a manner in which at least one entity out of (a) memory management metadata, (b) the first data unit and (c) at least one other data unit, should be stored in the flash memory device; and programming the at least one entity in the flash memory device in response to the second command.

A method may be provided and may include receiving, by a flash storage device and from a host computer, a first command that indicates that data associated with a second command should be programmed to a flash memory buffer of the flash storage device; wherein the first command may include a first address that belongs to a memory space that is not mapped to user data: and receiving the second command; wherein the second command may include a second address and a data unit; ignoring, by the flash storage device, the second address and programming the data unit to the flash memory buffer.

A method may be provided and may include receiving, by a flash storage device, a copy-back and stitch command from a host computer: copying, in response to the copy-back and stitch command, first data from a first location of a flash memory device of the flash storage device to a random access memory (RAM) device of the flash storage device; wherein the copying is executed without sending the first data to host computer; receiving second data from the host computer: and storing the first data and the second data at a second location of the flash memory device.

A method may be provided and may include receiving, by a flash storage device and from a host computer, first data; receiving, by the flash storage device, a data segmentation and signature calculation command: segmenting the first data to data segments and calculating a size of each data segment; calculating, by the flash storage device, a signature for each data segment of the data segments; receiving, from the host computer, a segment size and signature retrieval command: and sending to the host device information indicative of a signature and a size of each data segment.

A method may be provided and may include receiving, by a flash storage device and from a host computer, a metadata recovery command; and sending, from the flash storage device, metadata that is retrieved from predetermined locations in the flash storage device.

Additional embodiments of the invention include a system arranged to execute any or all of the methods described above, including any stages and any combinations of same. For example, the system may include (i) a flash memory may include an interface for receiving from a host computer a first command that is a write command of a first data unit to a flash memory device and for receiving from the host computer, a second command that is indicative of a manner in which at least one entity out of (a) memory management metadata, (b) the first data unit and (c) at least one other data unit, should be stored in the flash memory device; and a programming circuit arranged to program the at least one entity in the flash memory device in response to the second command.

Additional embodiments of the invention include a flash storage system is arranged to execute any or all of the methods described above, including any stages and any combinations of same. For example, the flash storage system may include a flash memory controller and a flash memory device. The flash storage device may be arranged to receive, a copy-back and stitch command from a host computer; copy, in response to the copy-back and stitch command, first data from a first location of a flash memory device of the flash storage device to a random access memory (RAM) device of the flash storage device: wherein the copying is executed without sending the first data to host computer: receive second data from the host computer; and store the first data and the second data at a second location of the flash memory device.

Additional embodiments of the invention include a flash storage system is arranged to execute any or all of the methods described above, including any stages and any combinations of same. For example, the flash storage system may include a flash memory controller and a flash memory device. The flash storage device may be arranged to receive from a host computer, first data: receive a data segmentation and signature calculation command; segment the first data to data segments and calculating a size of each data segment: calculate a signature for each data segment of the data segments: receive from the host computer a segment size and signature retrieval command; and send to the host device information indicative of a signature and a size of each data segment.

Additional embodiments of the invention include a flash storage system is arranged to execute any or all of the methods described above, including any stages and any combinations of same. For example, the flash storage system may include a flash memory controller and a flash memory device. The flash storage device may be arranged to receive from a host computer, a metadata recovery command; and send, metadata that is retrieved from predetermined locations in the flash storage device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates a conventional write command;

FIGS. 2, 4, 5, 8, 9, 10 and 12 illustrate various methods according to various embodiments of the invention;

FIGS. 3, 6, 7 and 11 illustrate various special commands according to various embodiments of the invention.

Figure 2:
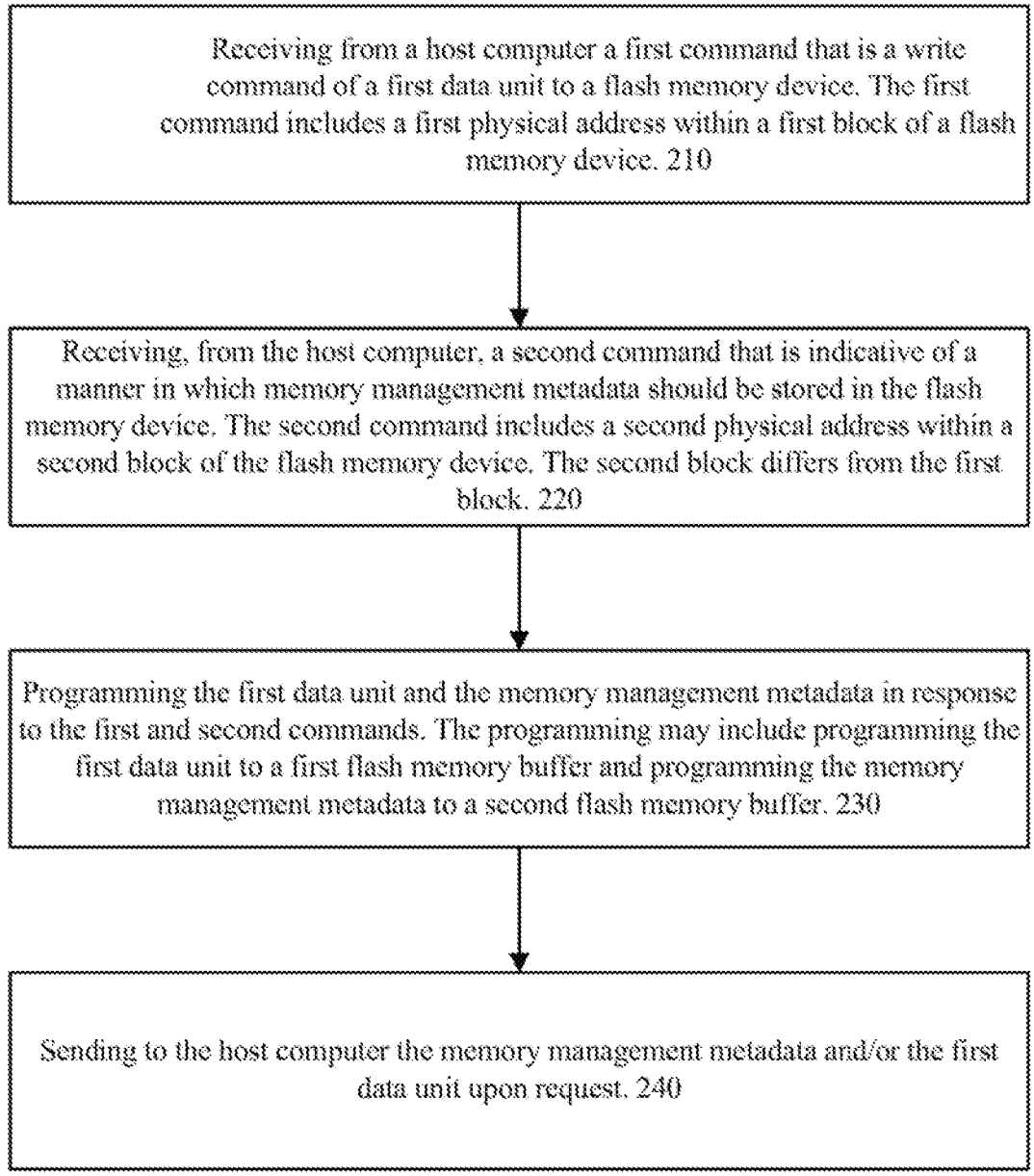

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms "flash memory block" may be interpreted as a flash memory erase block.

There may be provided various interfaces and protocol changes to support flash memory management that is split between a host computer and a flash storage device. Standard interfaces may be used for implementing efficient protocols that enable the memory management to be split in a reliable manner.

There may be provided a protocol and an interface between a flash storage device and a host computer that may allow one or more blocks to store metadata (related to memory management operations to be executed on data) and one or more other blocks to store data. This partition between memory management metadata and data can assist in retrieval of the memory management metadata.

There may be provided a protocol and an interface between a flash storage device and a host computer that may allow a reception of a programming command that is followed by a reception of a sector that may include memory management metadata which is concatenated to the end of each data segment prior to the programming of the data to a flash memory module of the flash storage device.

There may be provided a protocol and an interface between a flash storage device and a host computer that may allow a reception of a sector containing memory management metadata about data and a reception of the data, wherein the memory management metadata is concatenated to the end of each data segment prior to programming.

There may be provided a protocol and an interface between a flash storage device and a host computer that may enable the flash storage device to operate in a special mode (test mode) that allows defining open flash memory buffers and/or open flash memory blocks for sequential programming. The special mode may be entered by writing to certain interface addresses that may belong to a memory space that is not defined in the user space). That memory space can includes addresses that exceed the site of the physical memory space of the flash memory device.

When operating in the special mode, sector writes, regardless of the address, may be written one after the other into the open buffers. Addresses included in one or more commands received when operating in the special mode may be concatenated at the end of each data segment.

Conveniently, different buffers may be open simultaneously. Data may be directed to the different buffers by modifying the most significant address bits, beyond the available user space.

According to an embodiment of the invention metadata reading may be provided. Metadata may be used for recovery when not all memory management information has been written. Special read commands defined by appropriate addresses are used to read that memory management metadata appended to each segment.

According to an embodiment of the invention there may be provided special copy-back and stitch commands that can relieve host computer from receiving data and then sending it back when performing cleaning or writing just a portion of a segment.

According to various embodiments of the invention there may be provided special commands that may be used to define an open block as SLC for the purpose of fast management and reliable programming. For example, when using the special modea buffer can be opened which writes new data only to the LSB pages in an MLC or SLC device. Alternatively, data written to that buffer will be written after setting the flash memory device into special SLC mode where only 1 bit per cell is being written. Those buffers may be more reliable and store different management data such as physical to logical translation tables, and the access to these buffers (during reads and write) will be typically much faster.

According to an embodiment of the invention there may be provided special metadata recovery commands that facilitate a retrieval of metadata from a flash memory device. This retrieval of metadata can be performed when memory management data structures are corrupted or are faulty. The retrieval of the memory management metadata can assist the host computer in reconstructing memory management data structures.

According to various embodiment of the invention each one of the so-called special commands (that may used to enter the flash memory controller to a special mode or to be exchanged when operating in a special mode) can be identified as including an address that is within a memory space that is not included in a memory space allocated for user data. Redundant bits (for example—few most significant bits) in address fields of a command can be used to distinguish between the different special commands. These redundant bits can be used to enter the flash memory controller into a special mode (or test mode) and execute various memory management commands.

According to an embodiment of the invention a flash storage device may be arranged to write sequentially into open blocks of the flash memory device.

Various embodiments of the invention facilitate writing sequentially into open flash memory blocks in a manner that automatically adds meta data to the written data, without actually transmitting the meta data over the interface, this allows saving time on additional meta data transmissions. The metadata which is automatically added may simply be the logical address of each 512 sector or 4096 sector. This can be facilitated by sending memory management metadata to the flash storage device and by retrieving memory management metadata from the flash memory device. This may be done to overcome problems with power failures. That is, if one or more memory management data structures are not stored in time into the flash, the metadata recovery command can be used to recover the latest changes to these memory management data structures from metadata attached to the data blocks.

Separation Between Metadata and Data an a Flash Memory Erase Block Basis

According to an embodiment of the invention data is written to one or more open flash memory blocks or one or more flash memory buffers while the memory management metadata is written to another open one or more flash memory blocks or one or more other flash memory buffers.

According to an embodiment of the invention writing to physical addresses which are aligned to physical block addresses on the flash memory devices, may cause the flash memory controller to open new blocks for writing.

FIG. 2 illustrates method 200 according to an embodiment of the invention.

Method 200 may include the following stages:
a. Receiving (210) from a host computer a first command that is a write command of a first data unit to a flash memory device. The first command includes a first physical address within a first block of a flash memory device.
b. Receiving (220), from the host computer, a second command that is indicative of a manner in which memory management metadata should be stored in the flash memory device. The second command includes a second physical address within a second block of the flash memory device. The second block differs from the first block.
c. Programming (230) the first data unit and the memory management metadata in response to the first and second commands. The programming may include programming the first data unit to a first flash memory buffer and programming the memory management metadata to a second flash memory buffer. Additionally or alternatively, the programming may include storing the first data unit and the memory management metadata at blocks of the flash memory device that differ from each other. These blocks may differ from the first and second blocks—as the flash memory controller can determine to which blocks to write the metadata and the first data unit based upon memory management considerations (for example—which blocks are currently open.)
d. Sending (240) to the host computer the memory management metadata and/or the first data unit upon request. The retrieval of the memory management metadata can assist the host computer to perform memory management operations such as wear leveling, and the like.

FIG. 3 illustrates first command 310 and second command 320 according to an embodiment of the invention.

The first command 310 includes a first physical address 311 that is within a first physical block, and data units Data0-Data2 312, 314 and 316.

The second command 320 includes a second physical address 321 that is within a second physical block, and memory management metadata units MetaData0-MetaData2 322 that are associated with the data units 312, 314 and 316.

Read or Write Commands and Proximate Metadata Provision Commands

According to an embodiment of the invention the flash storage device may be modified to support additional supply of metadata using transactions that either immediately follow or precede the data write command.

The term immediately may refer to a relatively short time periods that may be short enough to allow an easy link between the memory management metadata and the data. It may be expected that during these short time periods other data units not related to the memory management metadata are not expected to be exchanged over the interface.

For example, following a sequence of 4K segments (the length of the sequence may be limited by protocol), the following write command would hold the memory management metadata which will be internally concatenated to the data segments and programmed into the flash device (data+metadata). To identity the additional write transaction as a memory management metadata transaction, the address given to that transaction may be the same as the original data transaction.

Memory management commands (also referred to as special commands) that differ from standard read or write commands can be used and can be identified by unique addresses that belong to a memory space that does not belong to a memory space allocated for user data For example, a typical address space for a write transaction may be 32 bits allowing addressing a 2 TB address space. Yet, the flash storage device may have only 256 GB of address space (for user data). Therefore, transaction addresses with non-zero 6 most-significant bits may be used to indicate different types of memory management commands.

Figure 4:
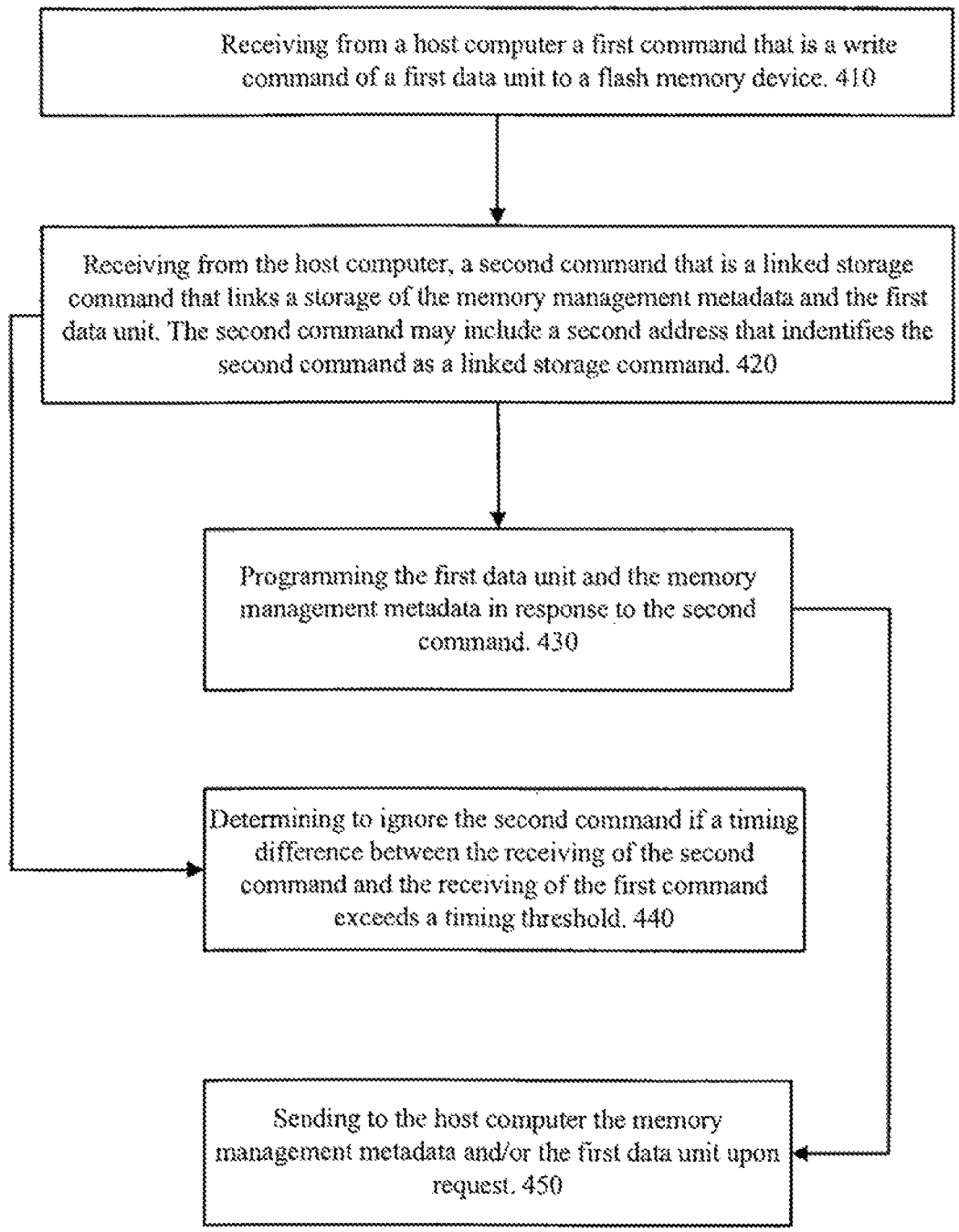

FIG. 4 illustrates method 400 according to an embodiment of the invention.

Method 400 may include the following stages:
a. Receiving (410) from a host computer a first command that is a write command of a first data unit to a flash memory device.
b. Receiving (420), from the host computer, a second command that is a linked storage command that links a storage of the memory management metadata and the first data unit. The second command may include a second address that identifies the second command as a linked storage command. The second address may belong to a memory space that is not mapped to user data and may not be mapped to physical addresses of the flash memory device. The second command may be indicative of a programming the first data unit and the memory management metadata to proximate locations of a flash memory device. The second command may be indicative of a concatenation of the first data unit and the memory management metadata.
c. Programming (430) the first data unit and the memory management metadata in response to the second command. The programming may include, for example, programming the first data unit and the memory management metadata to proximate locations of a flash memory device. Yet for another example, the programming may include concatenating the first data unit and the memory management metadata and programming a sequence that includes the first data unit and the concatinated memory management metadata.
d. Determining (440) to ignore the second command if a timing difference between the receiving of the second command and the receiving of the first command exceeds a timing threshold.
e. Sending (450) to the host computer the memory management metadata and/or the first data unit upon request. The retrieval of the memory management metadata can assist the host computer to perform memory management operations such as wear leveling, data recovery and the like.

Opening One or More Buffers in Special Mode

There can be provided a special command that indicates that following write transactions will be written sequentially to an open buffer, regardless of the transaction address included in these following write commands.

The data written to the flash memory device can be concatenated with memory management metadata which is defined by the address of the transaction. A typical memory management metadata includes the logical address of the data. Thus, this method may save additional write transactions used to store the memory management metadata. Multiple several buffers can be opened concurrently for writing and be distinguished by allocating different addresses to different buffers. For example, these addresses can belong to a memory space not allocated for user data and may even belong to a memory space that is not mapped to any physical address of the flash memory device. These addresses can be defined by unique combinations of most-significant bits of the write transaction. For example, if the address space for a write transaction is 2 TB and the flash storage device has 256 GB, we can use the upper 6 MSBs to indicate different buffer destinations.

Figure 5:
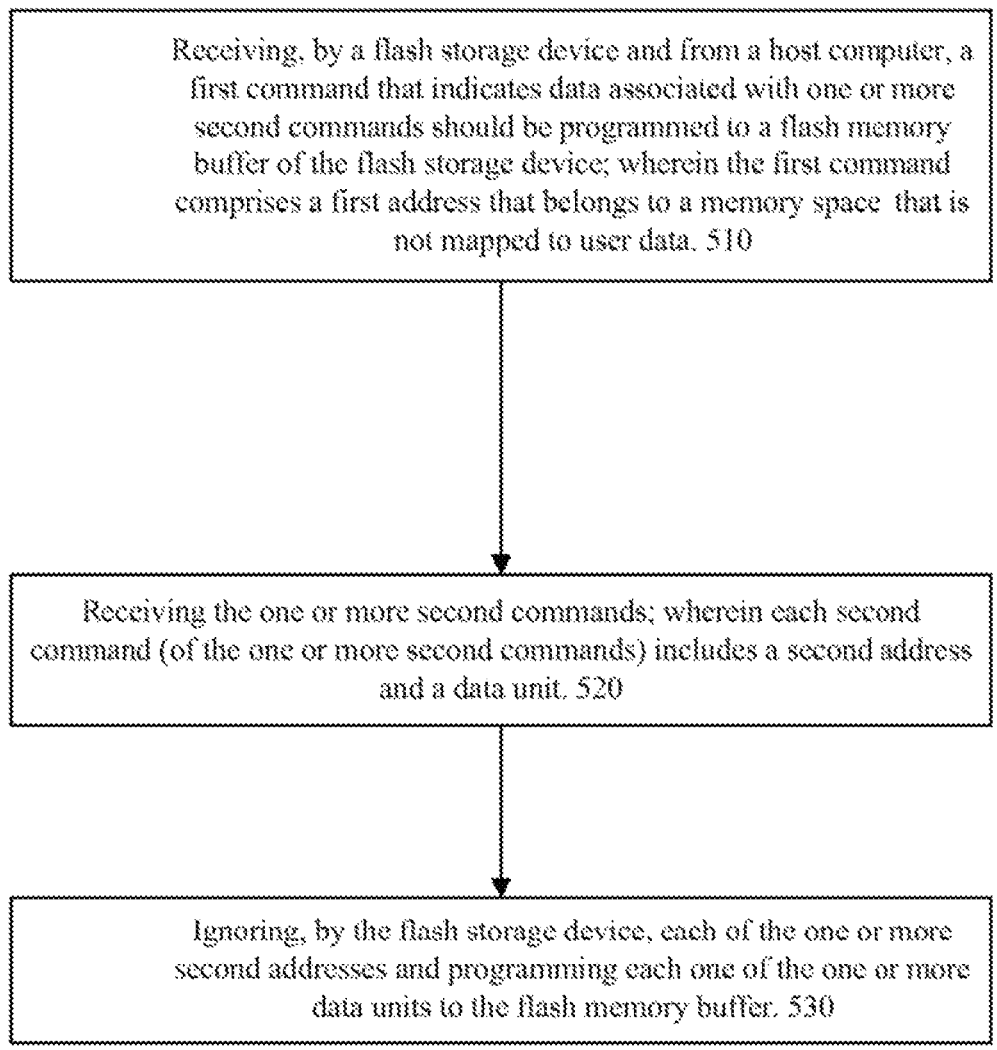

FIG. 5 illustrates method 500 according to an embodiment of the invention.

Method 500 may include the following stages:
a. Receiving (510), by a flash storage device and from a host computer, a first command that indicates data associated with one or more second commands should be programmed to a flash memory buffer of the flash storage device; wherein the first command comprises a first address that belongs to a memory space that is not mapped to user data
b. Receiving (520) the one or more second commands; wherein each second command (of the one or more second commands) includes a second address and a data unit.
c. Ignoring, by the flash storage device, each of the one or more second addresses and programming (530) each one of the one or more data units to the flash memory buffer. The programming may include selecting the flash memory buffer out of multiple flash memory buffers based upon a value of the first address.

FIG. 6 illustrates first command 600 according to an embodiment of the invention.

The first command 600 includes a first physical address 610, a physical block address to be opened 620 and MSB bits identifiers 630.

In a more general approach, multiple buffers can be opened simultaneously—or at least be opened during at least partially overlapping periods. Each buffer can be opened by a command, wherein he different buffers are identified by different values of first addresses. A single write transaction can include receiving a command that includes (a) a first address that has a unique value that indicates that the this write transaction is a special one and modifies the way the device will behave, (b) second and third fields that may include the data which is associated with the write transaction. The flash memory controller may identify (based upon the unique value of the first address) that this is a special write transaction, and then may parse the data associated with the write transaction (included in the second and third fields), instead of just writing the entire data fields into the flash memory module. The second field may indicate that the following write operations which are indicated by a certain value of the upper bits should be written to a certain block (physical buffer) on the flash device. The second field indicates which block will be written to sequentially and the third field defines what are those certain upper bits that are compared against. Thus, by setting the addresses with a given set of MSB bits, we may determine to which buffer the data will be directed and may be automatically concatenated with metadata.

Copy Back and Data Stitching

During memory management operation it is quite common to copy data from one location to another location in the Flash memory. However, if the memory is managed at the host, this may require sending the data from the flash over the host interface and then back with a new write command. We therefore suggest using an internal copy-back and stitch commands. Again, these commands are applied by a protocol over the standard interface using special addresses.

During a management cleaning operation, we would be required to copy data from one physical location, add data from host and store that in an open buffer. For that purpose we would use the copy-back and stitch command. The host computer will send a copy back and stitch command that would instruct the flash storage device to internally read a certain numbers of segments into a RAM buffer. The flash storage device would then wait to receive a certain number of segments to be stored in the RAM buffer in certain locations and when all data was received from host, the RAM buffer would be transferred into an open block in the flash memory device.

FIG. 7 illustrates a copy-back and stitch command 700 according to an embodiment of the invention.

The copy-back and stitch command 700 includes:
a. A first address 710 that identifies the command as a copy-back and stitch command 700.
b. A number of segments to be read field 720 indicative of the number of data segments to be read from the flash memory device during the copy-back operation.
c. A segment physical addresses field 730 indicative of the location of the segments of the data segments to be copied-back.
d. A segment locations on buffer field 740 indicative of where to store the data segments in the RAM buffer.
e. A number of segments from host to be stitched field 750 indicative of the number of data segments to be received by the host and be stitched to the data segments that were retrieved from the flash memory device.
f. A segment locations on buffer field 760 indicative of where to store the data segments received from the host computer in the RAM buffer.
  Accordingly—a single command can cause the flash memory controller to read, for example, three 4 kb segments from the controller ran buffers and put them at first locations 8192 and 16384 and then get from the host two 4 kb segments and put them in the controller ram buffers at locations 4096 and 8192+4096 and then program everything into the flash block
g. An open buffer destination 770 field indicative of where to program the stitched data segments (from the host and from the flash memory device). There may be several open erase blocks in the flash which are being written to, say 4. Therefore, the last field indicates to which block to write the data.

Thus, a significant amount of communication between host and flash storage device has been saved.

Figure 8:
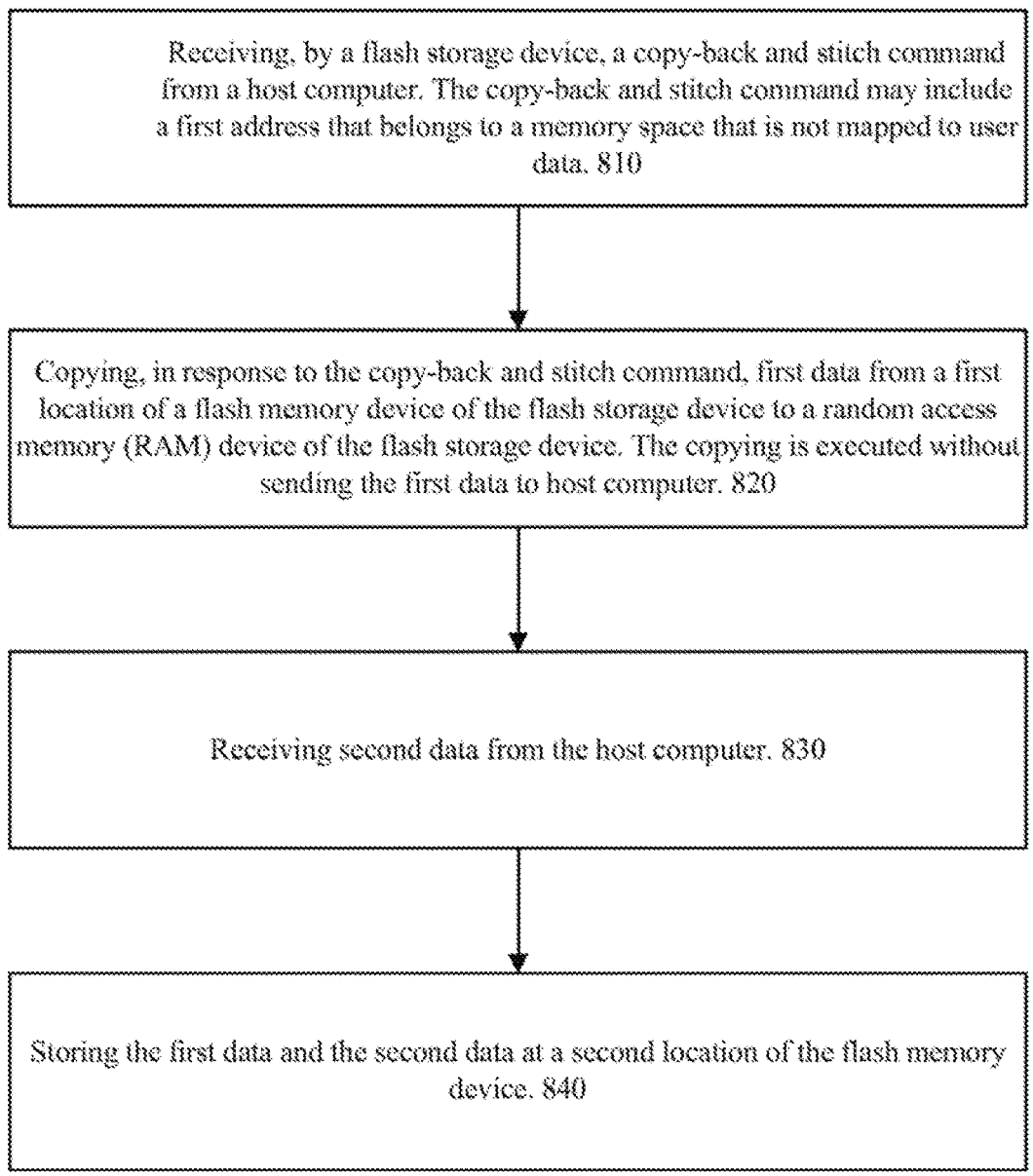

FIG. 8 illustrates method 800 according to an embodiment of the invention.

Method 800 may include the following stages:
a. Receiving (810), by a flash storage device, a copy-back and stitch command from a host computer. The copy-back and stitch command may include a first address that belongs to a memory space that is not mapped to user data.
b. Copying (820), in response to the copy-back and stitch command, first data from a first location of a flash memory device of the flash storage device to a random access memory (RAM) device of the flash storage device. The copying is executed without sending the first data to host computer. This may includes several segments as explained before.
c. Receiving (830) second data from the host computer. This may includes several segments as explained before.
d. Storing (840) the first data and the second data at a second location of the flash memory device. The first and second data can be stored together—in a consecutive manner—in a "stitched" manner. The storing may include at least one out of:
  i. Determining the first location in response to a second address field included in the copy-back and stitch command.
  ii. Determining a location in the random access module to store the first data in response to a third address field of the copy-back and stitch command.
  iii. Determining an amount of second data to receive from the host based upon a second data size field of the copy-back and stitch command; and
  iv. Determining the second location in response to a fourth address field of the copy-back and stitch command.

Last, to enable efficient storing of management information on flash it is common to use some of the flash memory device in SLC mode instead of MLC/TLC mode. Those SLC blocks are faster to program and more reliable. Therefore, they store important management information.

De-Duplication Assistance

The host may apply de-duplication algorithms to reduce the actual number of writes to the flash memory device and thus effectively enable larger over-provisioning. In that case, the flash storage device may perform some hardware acceleration task to reduce the load from the host computer.

The acceleration tasks may include hash calculation and Rabin like CRC calculation to repeatedly cut input data into sections, regardless of data shifts. That is, the data may be pushed through the CRC calculator which cuts the data whenever the CRC vector is equal to 0, for example, or when even the segment reaches a certain size. Simultaneously, the hash may be calculated for each segment.

The above hash and CRC segmentation processes may be performed by hardware in the flash storage device which may return the segment size and Hash value for comparison by the host.

Therefore, we can define the following test-mode commands to enable de-duplication notification to the host:

De-duplication parameter setting can be made using a special command that rides over the standard interface protocol. Following the header, the data packet would contain the parameters for the hash calculation, the CRC polynomial and maximum number of packets expected. Once this command is sent to the flash storage device all data will be passed through CRC and hash calculators.

Hash read command can be a special command which rides over the standard interface protocol. This command outputs in the data packets the hash and segment size results for new segments.

The flash storage device may await notification of whether to write through the new data or discard it as it is a duplicate of existing data. This notification may come in a form which lets the flash storage device know which of the segments to write to the Flash device and to which destination Flash buffer.

Figure 9:
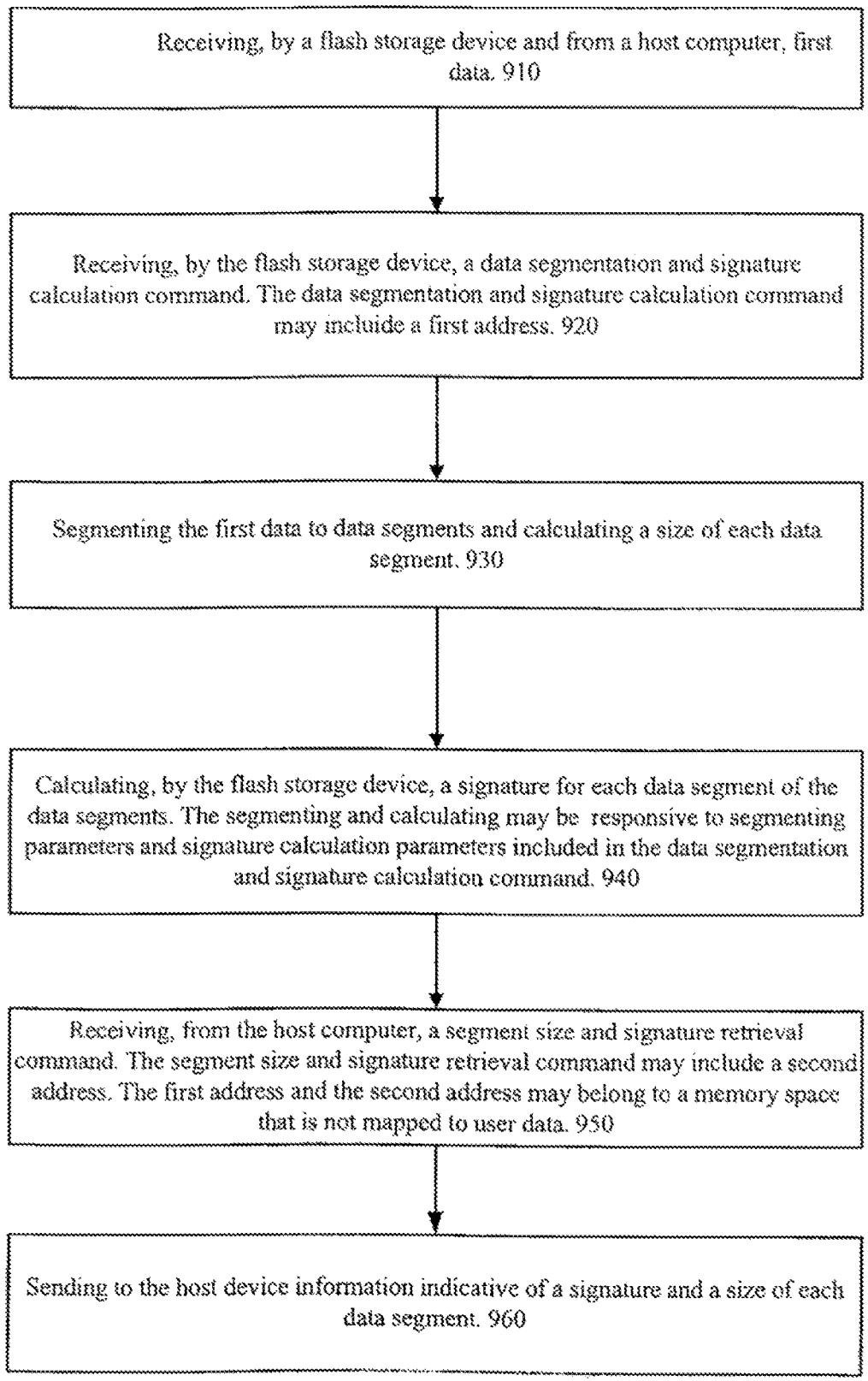

FIG. 9 illustrates method 900) according to an embodiment of the invention.

Method 900 may include the following stages:
a. Receiving (910), by a flash storage device and from a host computer, first data.
b. Receiving (920), by the flash storage device, a data segmentation and signature calculation command. The data segmentation and signature calculation command may include a first address.
c. Segmenting (930) the first data to data segments and calculating a size of each data segment.
d. Calculating (940), by the flash storage device, a signature for each data segment of the data segments. The segmenting and calculating may be responsive to segmenting parameters and signature calculation parameters included in the data segmentation and signature calculation command.
e. Receiving (950), from the host computer, a segment size and signature retrieval command. The segment size and signature retrieval command may include a second address. The first address and the second address may belong to a memory space that is not mapped to user data.
f. Sending (960) to the host device information indicative of a signature and a size of each data segment.

Recovery of Metadata

According to an embodiment of the invention memory management metadata can be stored in known locations (for example—dedicated buffers, dedicated blocks, predetermined locations in pages).

This may assist in retrieving such memory management metadata—even if various memory management data structured are corrupted FIG. 10 illustrates a method 1000 according to an embodiment of the invention.

Method 1000 may include the following:
a. Receiving (1010), by a flash storage device and from a host computer, a metadata recovery command. The metadata recovery command may include a first address that belongs to a memory space that is not mapped to user data. The value of the first address can identify this command as a metadata recovery command. Alternatively, a special command may indicate that the read result of all following standard read command will only read the meta-data associated with the addresses of those standard commands and not the actual data associated with those addresses,
b. Sending (1020), from the flash storage device, metadata that is retrieved from predetermined locations in the flash storage device.

Figure 11:
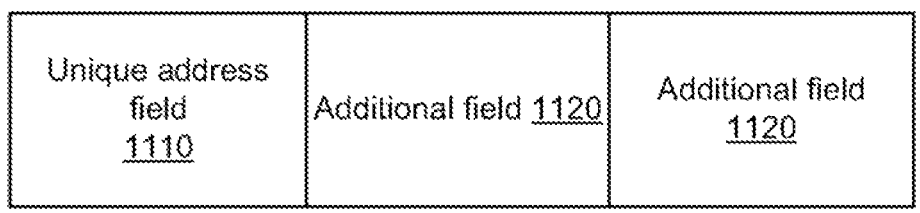

FIG. 11 illustrates a special command 1100 according to an embodiment of the invention.

The special command 1100 can be any of the mentioned above commands, including a metadata recovery command, a copy-back and stitch command, a data segmentation and signature calculation command, a segment size and signature retrieval command, a definition of a MLC block as a SLC block command (causes the flash memory controller to program a MLC block as an SLC block), an open buffer command (a command that indicates that data associated with one or more second commands should be programmed to a flash memory buffer of the flash storage device), and the like.

The special command 1100 includes a unique address field 1110 that includes a unique address that is not allocated for user data and may belong to a memory space that is not mapped to any physical space of the flash memory device, and at least one additional field 1120 that may change according to the type of the special command 1100. It is noted that the values of address field 1100 are indicative of which type of special command is the special command and may also be indicative of different buffers or blocks to be opened. The latter distinction can be done by using one of the additional fields 1120.

Figure 12:
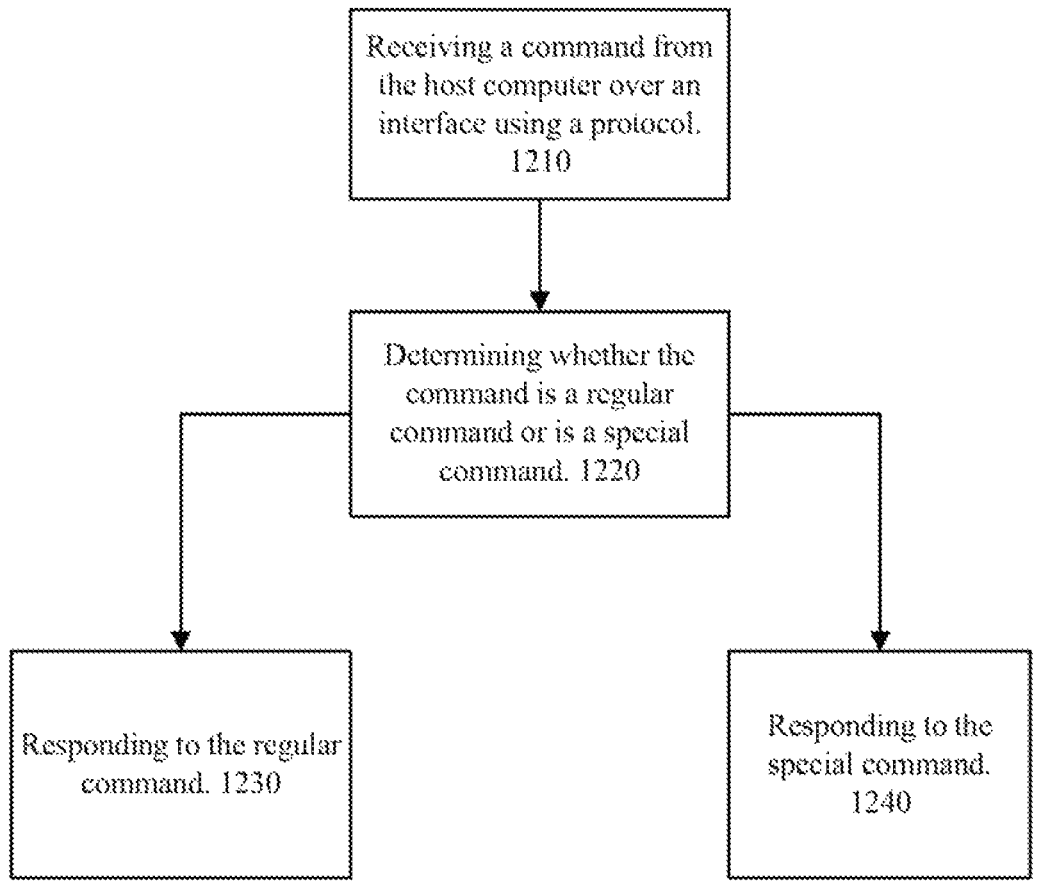

FIG. 12 illustrates a method 1200 according to an embodiment of the invention.

Method 1200 starts by receiving (1210) a command from the host computer over an interface using a protocol.

The receiving is followed by determining (1220) whether the command is a regular command (and jumping to stage 1230) or is a special command (and jumping to stage 1240). The determination can be responsive to the presence (or absence) of an address that is mapped outside the address space allocated to user data and especially outside the flash memory device physical memory space. Stage 1220 may also include determining the type of the regular command (read write or erase) or of the special command (any of the mentioned above special commands).

Stage 1230 includes responding to the regular command.

In any of the methods mentioned above the memory management metadata can be used, by the flash memory controller, by the host computer or both entities to perform memory management operations.

Figure 13:
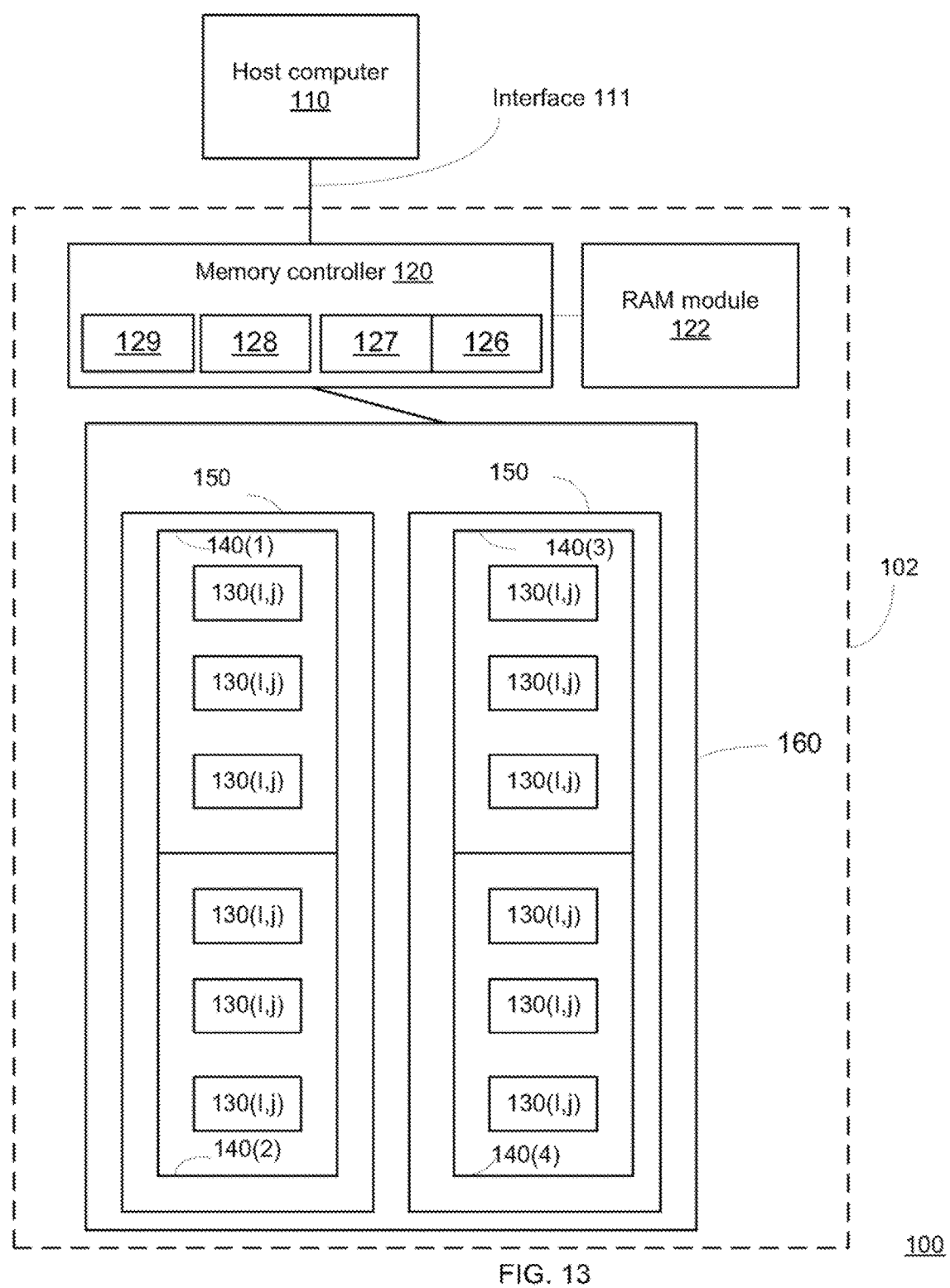
FIG. 13 illustrates a system according to an embodiment of the invention.

FIG. 13 illustrates a system 100 according to an embodiment of the invention.

The system 100 include a host computer 110 and a sub-system 102. The sub-system includes a memory controller (such as a flash memory controller) 1240, a RAM module 122, and a flash memory device 160. The flash memory device 160 is illustrated as having two flash memory dies 150(1) and 150(2), that include blocks 140(1)-140(4) respectively. Each block may include multiple pages such as flash memory pages 130(i,j). The memory controller 120 is coupled to host controller 110 via interface 111 and is also coupled to the RAM module 122 and to the and to the flash memory device 160. The number of pages, dies, and blocks may differ from those illustrated in FIG. 13. The memory controller 120 can include a read circuit 129, a write circuit 128, an interface 127 and an erase circuit 126.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM. CD-R, etc.) and digital video disk storage media: nonvolatile memory storage media including semiconductor-based memory units such as FLASH memory, EEPROM, EPROM. ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back." "top," "bottom." "over." "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an." as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium that stores instructions for:

receiving, by a flash memory device, from a host computer and over an interface a first command that is a write command of a first data unit to the flash memory device; wherein the first command is a combination of a first physical address within the flash memory device and data;

receiving, by the flash memory device, from the host computer and over the interface, a second command that is indicative of a manner in which memory management metadata associated with the first data unit should be stored in the flash memory device; wherein the second command is a combination of a second address and the memory management metadata; and programming, by the flash memory device, the memory management metadata and the first data unit in the flash memory device in response to both the first command and the second command, wherein the programming, by the flash memory device, of the memory management metadata in the flash memory device in response to the second command occurs only if the second command is received immediately before the first command or is immediately received after the first command, and wherein immediately refers to a time period between the receiving of the first command and the receiving of the second command during which the interface does not convey a different data unit that differs from the first data unit and is not associated with the memory management metadata.

2. The non-transitory computer readable medium according to claim 1, wherein the first physical address is within a first block of the flash memory device; wherein second address is a second physical address that is within a second block of the flash memory device; wherein the second block differs from the first block; and
wherein the non-transitory computer readable medium stores instructions for storing the first data unit in a first flash memory buffer and storing the memory management metadata in a second flash memory buffer.

3. The non-transitory computer readable medium according to claim 1, wherein the first physical address is within a block of the flash memory device;
wherein the second address is a second physical address that is within a second block of the flash memory device;
wherein the second block differs from the first block; and
wherein the non-transitory computer readable medium stores instructions for storing the first data unit and the memory management data at blocks of the flash memory device that differ from each other.

4. The non-transitory computer readable medium according to claim 1, wherein the second address identifies the second command as a linked storage command that links a storage of the memory management metadata and the first data unit.

5. The non-transitory computer readable medium according to claim 1, wherein the first command and the second command are sent over the interface using a format of a protocol that does not allow sending the memory management metadata attached to the data unit.

6. The non-transitory computer readable medium according to claim 1, wherein the second command commands a concatenation of the first data unit and the memory management metadata.

7. The non-transitory computer readable medium according to claim 1, wherein the second address belongs to a memory space that is not mapped to physical addresses of the flash memory device.

8. The non-transitory computer readable medium according to claim 1, that stores instruction for ignoring the second command if a timing difference between the receiving of the second command and the receiving of the first command exceeds a timing threshold.

9. The non-transitory computer readable medium according to claim 1, that stores instructions for programming the first data unit to a flash memory buffer that is managed at a different granularity than at least one other flash memory region of the flash memory device.

10. A method comprising:
receiving, by a flash memory device, from a host computer and over an interface a first command that is a write command of a first data unit to the flash memory device; wherein the first command is a combination of a first physical address within the flash memory device and data;
receiving, by the flash memory device, from the host computer and over the interface, a second command that is indicative of a manner in which memory management metadata associated with the first data unit should be stored in the flash memory device; wherein the second command is a combination of a second address and the memory management metadata; and
programming, by the flash memory device, the memory management metadata and the first data unit in the flash memory device in response to both the first command and the second command,
wherein the programming, by the flash memory device, of the memory management metadata in the flash memory device in response to both the first command and the second command occurs only if the second command is received immediately before the first command or is immediately received after the first command, and
wherein immediately refers to a time period between the receiving of the first command and the receiving of the second command during which the interface does not convey a different data unit that differs from the first data unit and is not associated with the memory management metadata.

11. The method according to claim 10, wherein the first physical address is within a first block of the flash memory device; wherein the second address is a second physical address that is within a second block of the flash memory device; wherein the second block differs from the first block; and
wherein the method comprises storing the first data unit in a first flash memory buffer and storing the memory management metadata in a second flash memory buffer.

12. The method according to claim 10, wherein the first physical address is within a block of the flash memory device; wherein the second address is a second physical address that is within a second block of the flash memory device; wherein the second block differs from the first block; and wherein the method storing the first data unit and the memory management metadata at blocks of the flash memory device that differ from each other.

13. The method according to claim 10, wherein the second address identifies the second command as a linked storage command that links a storage of the memory management metadata and the first data unit.

14. The method according to claim 10, wherein the first command and the second command are sent over the interface using a format of a protocol that does not allow sending the memory management metadata attached to the data unit.

15. The method according to claim 10, wherein the second command commands a concatenation of the first data unit and the memory management metadata.

16. The method according to claim 10, wherein the second address belongs to a memory space that is not mapped to physical addresses of the flash memory device.

17. The method according to claim 10, comprising ignoring the second command if a timing difference between the receiving of the second command and the receiving of the first command exceeds a timing threshold.

18. The method according to claim 10, comprising programming the first data unit to a flash memory buffer that is managed at a different granularity than at least one other flash memory region of the flash memory device.

19. A flash memory comprising:
an interface for receiving from a host computer a first command that is a write command of a first data unit to a flash memory device and for receiving, from the host computer, a second command that is indicative of a manner in which memory management metadata associated with the first data unit should be stored in the flash memory device; and
a programming circuit to program the memory management metadata and the first data unit in the flash memory device in response to both the first command and the second command; wherein the first command is a combination of a first physical address and data and the second command is a combination of a second address and the memory management metadata, wherein the programming circuit programs the memory management metadata in the flash memory device in response to the first command and the second command only if the second command is received immediately before the first command or is immediately received after the first command, and wherein immediately refers to a time period between the receiving of the first command and the receiving of the second command during which the interface does not convey a different data unit that differs from the first data unit and is not associated with the memory management metadata.

20. The flash memory according to claim 19, wherein the first command and the second command are sent over the interface using a format of a protocol that does not allow sending the memory management metadata attached to the data unit.

* * * * *